US007296218B2

United States Patent
Dittrich

(10) Patent No.: US 7,296,218 B2
(45) Date of Patent: Nov. 13, 2007

(54) INSTANT NOTE CAPTURE/PRESENTATION APPARATUS, SYSTEM AND METHOD

(76) Inventor: William A. Dittrich, 3301 G St., Vancouver, WA (US) 98663

( * ) Notice: Subject to any disclaimer, the term of this patent is extended or adjusted under 35 U.S.C. 154(b) by 0 days.

(21) Appl. No.: 11/350,682

(22) Filed: Feb. 8, 2006

(65) Prior Publication Data

US 2007/0186147 A1     Aug. 9, 2007

(51) Int. Cl.
   *G06F 17/00* (2006.01)
(52) U.S. Cl. .................... 715/500.1; 704/246
(58) Field of Classification Search ............ 715/500.1, 715/500.2; 704/246
   See application file for complete search history.

(56) References Cited

U.S. PATENT DOCUMENTS

| | | | |
|---|---|---|---|
| 6,173,317 B1 * | 1/2001 | Chaddha et al. ............ 709/219 |
| 6,546,405 B2 * | 4/2003 | Gupta et al. ................ 715/512 |
| 2002/0036694 A1 * | 3/2002 | Merril ........................ 348/220 |
| 2002/0056082 A1 * | 5/2002 | Hull et al. ...................... 725/1 |
| 2003/0013073 A1 * | 1/2003 | Duncan et al. ............. 434/317 |
| 2004/0143603 A1 * | 7/2004 | Kaufmann et al. ...... 707/104.1 |
| 2004/0153504 A1 * | 8/2004 | Hutchinson et al. ........ 709/204 |
| 2004/0225728 A1 * | 11/2004 | Huggins et al. ............ 709/223 |
| 2005/0160368 A1 * | 7/2005 | Liu et al. .................... 715/762 |
| 2005/0262442 A1 * | 11/2005 | Soin et al. .................. 715/533 |
| 2006/0149558 A1 * | 7/2006 | Kahn et al. ................. 704/278 |

OTHER PUBLICATIONS

Weber, Anke, et al, "Live Documents With Contextual Data-Driven Information Components", Proceedings of the 20th Annual International Conference on Computer Documentation, Oct. 2002, pp. 236-247.*

Manzato, Marcelo G., et al, "Live Video Adaptation: A Context-Aware Approach", Proceedings of the 11th Brazilian Symposium on Multimedia and the Web WebMedia '05, Dec. 2005, pp. 1-8.*

* cited by examiner

*Primary Examiner*—William Bashore
*Assistant Examiner*—Laurie Ries
(74) *Attorney, Agent, or Firm*—Ater Wynne LLP

(57) ABSTRACT

A live-presentation utterance-capture system includes a microphone accessible to a speaker at a live presentation; a voice-recognition mechanism configured linguistically to interpret a vocal utterance received at the microphone from the speaker; a database mechanism configured to store the linguistic interpretation of the vocal utterance in a visual form; and, optionally, a presentation mechanism configured to present to an audience at the live presentation a visual representation of the vocal utterance in the visual form. The live lecture notes capture and presentation method includes storing a visual presentation in a memory; converting the visual presentation to a slide show; presenting the slide show to a live audience; vocally augmenting the slide show using a microphone and voice recognition mechanism and storing a representation of the vocal augmentation in a memory; converting the stored augmentation to slide-show-compatible visual presentation that annotates the slide show; and storing the annotated slide show including the representation of the vocal augmentation in a memory. Live audiovisual presentation point capture/display apparatus includes a computer equipped with a microphone; a memory associated with the computer; software instructions residing in the memory and executing in the computer, the software instructions configured to recognize and store in text form an utterance received from a live speaker a the microphone; and a display mechanism configured to display to a live audience the stored text representing the utterance.

11 Claims, 2 Drawing Sheets

INSTANT NOTE CAPTURE/PRESENTATION APPARATUS, SYSTEM AND METHOD

BACKGROUND OF THE INVENTION

This invention relates generally to the field of live audio-visual presentations given by an author, lecturer or moderator, referred to generally herein as a presenter. More particularly, it concerns slide presentations in which one or more oral sidebars featuring a monologue, a dialog or both are extemporized during an otherwise canned presentation.

In support of lectures, oral presentations and other classroom activities the use of visual aids is common practice. Historically, the blackboard and later the overhead projector with transparencies were used. With the advent of the modern computer, computer projected statements and images are now dominating this practice. Software most commonly used is called Power Point™ for PC's and Slide-Show™ for Apple® computers. The use of these software programs, which will be referred to herein generically as slide sequencers, has dramatically improved these oral presentations in many ways.

However, the use of these software programs has also created a serious problem. Often the slide sequencer controls the lecture in a detrimental way. Many presenters simply read the script on the screen, losing valuable contact and interest with the audience. Many recipients of the oral presentation are left with boredom and loss of interest and retention.

There is no spontaneity in the presentation.

Even in modern television broadcasts, where a journalist's or commentators or forecaster's voice might be closed-captioned for the hard-of-hearing, the speaker typically reads from a script fed visually by a teleprompter and the speaker's voice is captured and captioned by a so-called stenocaptioner, i.e. a fancy court reporter with a stenography keyboard. Thus, there is no voice recognition, there is typically no spontaneity, there is no live-audience interaction and there is no storing of an augmented audiovisual (AV) presentation for later review, edit or publication.

Thus, the television audience goes to sleep.

Historically, the first use of visual aids in support of oral presentations and lectures was the use of written text and graphics on "poster board" type displays. The use of the "black boards and chalk" has been the most common form of visual aid for more than a hundred years. Recently, "black boards and chalk" have been replaced with "white boards and ink", which of course is very similar 'technology.' More recently, overhead projectors and transparencies have become a popular form of visual aids used in lectures. This 'technology' had the added beneficial effect of allowing the speaker to reuse the individual visual aid transparency frames. This saved time in preparation and allowed the speaker to repeat the presentation with no additional preparation time. In addition, transparencies could contain graphics as well as text to increase interest and retention of the oral presentation by the live audience. However, the use of the overhead projector and transparencies is a "static" system. That is, during the presentation, each individual transparency frame content is fixed and does not change before, during or after the presentation.

Upon widespread adaptation and use of the modern computer, the methods used as visual aids during oral presentations have changed dramatically. Using the computer and a computer projector, many useful visual aid software programs have been developed. Software programs that provide slide sequencer functionality are in widespread use today. There are other commercially available computer visual aid software programs but most skilled in the art use Power Point™ or Slide Show™ software programs. Computerized visual aid use has additional advantages beyond the use of the overhead transparency projector. Unique graphics and motion features can be added to individual visual aid frames resulting in increased viewer attention and retention of the lecture. However, even with the use of these computer methods the visual aids remain "static" in their use. As before, unless the presenter re-programs the individual visual aid frames using the software program, based upon live presentation interaction with the audience members, each frame remains the same, as does each successive presentation.

And even the live audience goes to sleep.

SUMMARY OF THE INVENTION

It is an object of this invention to enable a speaker during an oral presentation using a computer, computer visual aid software program (like Power Point™ or Slide Show™) and a computer projector and screen; to be able to instantly place text onto the screen from selected spoken words. This is accomplished using voice recognition software, a switch to activate the selection, and the invented Instant Point™ outliner/annotator software code to combine the power of the voice recognition software and the computer visual aid software. Instant Point™ is a trademark owned by the instant inventor, namely William A. Dittrich, of Portland, Oreg., all rights reserved.

It is an object of this invention to enable the presenter to modify the text placed on the screen using the Instant Point™ Outliner/Annotator technology such as to be able to make the words bold, change font, size, color and other minor changes in appearance. This would be accomplished by using a small control panel conveniently located near the presenter.

It is an object of the invention to enable the presenter to place the entire presentation into text form for storage and later reference. This would be particularly helpful in education for students with difficulty understanding the language of the presentation. By automatically placing the text of the lecture onto a world-wide website, or Internet site, the student could review the lecture and reinforce elements that were hard to understand during the lecture from language and hearing difficulties. In addition, the author of the material would be able to edit the new additions entered into the visual aid software by the Instant Point™ Outliner/Annotator for use in future presentations.

It is an object of this invention to dramatically increase the interest, attention, and retention of the material of the oral presentation through the use of the spontaneous additions to the visual aid program that the Instant Point™ Outliner/Annotator provides.

It is an object of the invention to transform computer visual aids for oral presentations into dynamic experiences for the live or web-based audience. All known prior art in the field have involved static presentations.

It is an object of the invention to enable the Instant Point™ Outliner/Annotator to spontaneously place text onto a computer and/or video screen utilizing visual aid software programs created specifically for use with the Instant Point™ Outliner/Annotator visual aid software programs, or for placing text into existing third-party, commercially available visual aid software programs such as Power Point™ and Slide Show™.

It is an object of the invention to enable a question from the audience and the answer from the speaker to be spontaneously displayed on the computer projector screen utilizing the Instant Point™ Outliner/Annotator technology.

It is an object of the invention to enable the speaker to quickly correct mistakes made by the voice recognition software for words displayed incorrectly on the computer projection screen. The standard computer keyboard could be used for this purpose. These corrections could also be made verbally by using the voice recognition software to identify the incorrect word and correct its spelling. A switch would be used to initiate correction using voice recognition software.

Accordingly, the invented live-presentation utterance-capture system includes a microphone accessible to a speaker at a live presentation; a voice-recognition mechanism configured linguistically to interpret a vocal utterance received at the microphone from the speaker; a database mechanism configured to store the linguistic interpretation of the vocal utterance in a visual form; and, optionally, a presentation mechanism configured to present to an audience at the live presentation a visual representation of the vocal utterance in the visual form. The live lecture notes capture and presentation method includes storing a visual presentation in a memory; converting the visual presentation to a slide show; presenting the slide show to a live audience; vocally augmenting the slide show using a microphone and voice recognition mechanism and storing a representation of the vocal augmentation in a memory converting the stored augmentation to slide-show compatible visual presentation that annotates the slide show; and storing the annotated slide show including the representation of the vocal augmentation in a memory. Live audiovisual presentation point capture/display apparatus includes a computer equipped with a microphone; a memory associated with the computer, software instructions residing in the memory and executing in the computer, the software instructions configured to recognize and store in text form an utterance received from a live speaker at the microphone; and a display mechanism configured to display to a live audience the stored text representing the utterance.

DETAILED DESCRIPTION OF THE PREFERRED EMBODIMENTS

Figure 1:
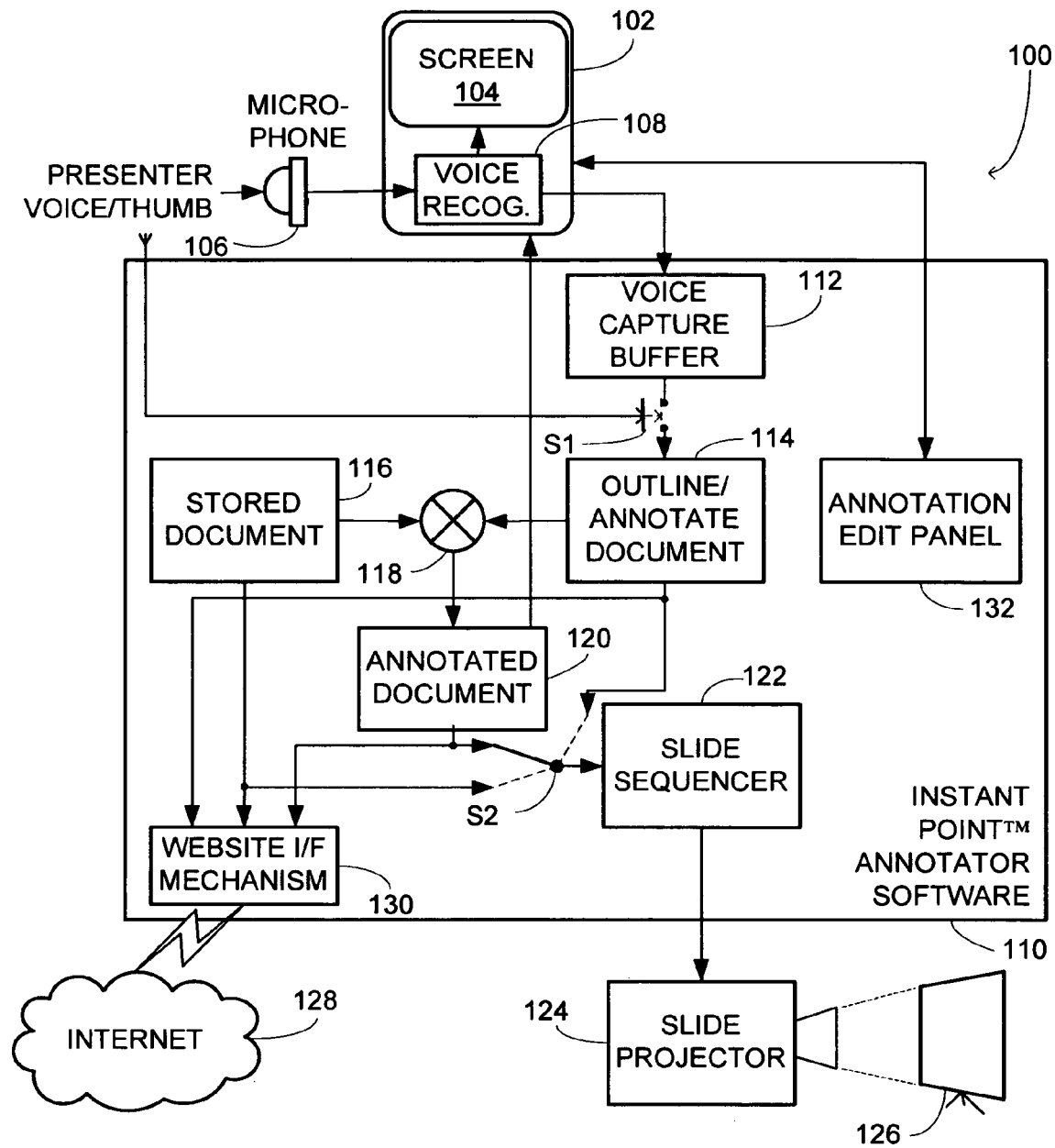
FIG. 1 is a schematic system block diagram illustrating the major blocks of the invented apparatus and system, in accordance with one embodiment of the invention.

The Instant Point™ Outliner/Annotator solves the problem of 'static' audiovisual/oral presentations by utilizing voice recognition software, unique Instant Point™ Outliner/Annotator software and existing computer presentation software or newly created computer presentation software. With Instant Point™ Outliner/Annotator, the presenter can instantly display text onto the screen without typing the words into a text document using a word processor. The presenter simply actuates a switch operatively connected with the computer, e.g. with a soft PC button, and, while the button is 'depressed', the spoken words immediately appear via voice recognition software on the screen. These words or text can then be modified for errors and changed in style or appearance (e.g. font, boldface, italic, size, color, etc.) as is usually done in the creation of any oral presentation or slide show. These changes are done from the computer in use or from a conveniently located control panel connected to the PC.

The tremendous advantage of using Instant Point™ Outliner/Annotator in any oral presentation is that it returns control of the presentation to the presenter. The presenter controls the lecture/oral presentation rather than the computer projection software controlling the presenter. Thus, the prior art problems are eliminated and spontaneity and interest return to the presentation. The Instant Point™ Outliner/Annotator vastly improves lectures and oral presentations of all types.

The Instant Point™ Outliner/Annotator applies to the field of computerized visual aid software programs used in support of oral presentations and lectures. These types of visual aid software programs are most commonly called Power Point™ (for PCs) and Slide Show™ (for Apple® computers). There are other commercially available visual aid software programs in use today, and the Instant Point™ Outliner/Annotator can be adapted for use with any of these oral presentation visual aid software programs.

The invention herein described called Instant Point™ Outliner/Annotator utilizes voice recognition software and a microphone connected to a computer. When a person delivers a verbal presentation such as a lecture, sales presentation, student project, report and so forth, the person places the microphone in a convenient spot for adequate reception and the voice signal is delivered to the computer and the open voice recognition application software. This program converts the spoken words from the presentation into digital words in an open text document such as Microsoft® WORD™. The purpose of this conversion is two-fold. First, a complete record of the words used in the presentation is created for storage and later review, edit, re-presentation or website posting. In the field, this record could be electronically delivered to a class web site, for example, for later review by students in the class (particularly students with hearing impairments or difficulty in understanding the language or accent used by the instructor). The second purpose of the conversion of verbally spoken words into digital words in a text document is for the instantaneous display of selected words onto a screen by a computer projector during the live presentation. This second purpose is the primary use for the Instant Point™ Outliner/Annotator and is described in further detail below.

Software programs such as Power Point™ (for PC's) and Slide Show™ (for Apple® computers) are frequently used to enhance a verbal presentation. Like the use of a poster board, black or white board, and overhead projector and transparency, the computer visual aid program significantly improves the presentation. These computer visual aids also significantly improved the prior art of visual aids when they were introduced for use a few years ago. However, these computer visual aids in use heretofore suffer a limitation that is shared by all known prior art in the field. This limitation is that they are 'static' in nature. All visual aids in the prior art display words and graphics onto a screen or board which do not individually change. The speaker or presenter simply refers to these words and reads them to the audience or talks about the subject introduced by the words. Many times the introduced topic is followed by key points associated with the topic and the presenter simply reads these follow-up key words to the audience. This produces a very 'dry' and boring lecture/presentation that also results in a lack of attention from the audience.

Another negative effect of the 'static' nature of prior art visual aids presentations is that after the presentation is completed the visual aid is stored for use again in the future without revision, improvement, or changes reflecting questions or additional points raised during the presentation. Thus, when the visual aid is used again in the future it remains the same as before and thus is 'static' in its use. In the field of education, this is very detrimental as it produces lectures that do not change and that do not reflect new information or questions of interest to the student. The only way the computerized visual aid individual frame will change or improve is if the presenter (or author) opens the program later and enters changes into each of the frames of the presentation after the presentation is given. This is often not practical to do because of time constraints or neglect, and so the presentation most commonly remains the same for use again. This invention solves this problem and produces a 'dynamic', computer-based visual aid.

FIG. 1 illustrates the operating principles of the Instant Point™ Outliner/Annotator software program by way of system 100 shown in block diagram form. A computer (PC) 102 having a screen 104 is operatively coupled to a microphone 106 that receives the spoken words of the speaker (Presenter Voice/Thumb) presenting the verbal presentation or lecture. Microphone 106 sends the electronic-voice signal into computer 102 equipped with voice recognition software (Voice Recog.) 108 such as Dragon Naturally Speaking (www.1st-dragon.com), for example, or any other commercially available voice recognition program. It is believed that, in the near future, all commercially available PCs will be equipped with voice recognition software as part of their standard operating systems (OSs).

Those of skill in the art will appreciate that PC 102 preferably also has installed in its memory a licensed copy of the invented Instant Point™ Outliner/Annotator software 110 described and illustrated herein. The function of Instant Point™ Outliner/Annotator software 110 is two-fold. First, as the digital text output from voice recognition software 108 enters Instant Point™ Outliner/Annotator software 110, the recognized words are first directed to a recognized voice capture buffer 112 for temporary storage of a digital representation of the words spoken by the presenter. When the presenter wants to record the spoken word that is being buffered, he or she simply depresses a first switch S1 (e.g. a thumb-actuated, momentary pushbutton switch shown in FIG. 1 in its normally open position) and the output of buffer 112 is stored in an outline/annotate document 114 for the purpose of making a permanent record (typically text only) of pertinent parts of the oral presentation in a memory. Memory within PC 102 also contains a stored document 116 that represents the presenter's planned presentation (which may contain text, graphics, flash, multimedia or any combination of visual content). The outputs of outline/annotate document 114 and stored document 116 are 'mixed', e.g. visually combined, in a mixer program 118 to produce an annotated document 120 that is also stored in a memory. (It will be appreciated that the output of annotated document 120 can be fed back as illustrated to PC 102 for presentation to the presenter on PC screen 104.)

Another purpose of Instant Point™ Outliner/Annotator software 110 is selectively to direct words, phrases and/or sentences to a video screen for visual presentation by use of a second switch S2. Thus, in accordance with one embodiment of the invention, the contents of outline/annotate document 114, stored document 116 and annotated document 120 are fed to second switch S2 for the purpose of conveying one of the three documents' contents to a slide sequencer 122. Slide sequencer 122 will be understood by those of skill in the art to represent an application software mechanism configured to prepare the content of the document selected by the presenter for display via a computer slide projector 124 on a video screen 126. Those of skill in the art will appreciate that slide sequencer 122, which may be custom software or which may be off-the-shelf canned software such as Power Point™ or Slide Show™, thus preferably includes or is augmented with projector software programmed to operate compatibly with any and all present and future computer projectors.

Thus the second function of Instant Point™ Outliner/Annotator software 110 is to direct the document selected by the presenter to three-way switch S2 that is now positioned to send the selected words to the visual aid program or slide sequencer 122 or any other commercially available visual aid program for computers. Those of skill in the art will appreciate that mixer software 118 preferably is programmed to accept outline/annotate document 114 from voice recognition software 108 and to properly position the outline/annotate content thereof relative to the visual frame or outline represented by stored document 116 to produce annotated document 120 the contents of which are a desirable blend or mix of the stored document, e.g. the canned presentation, and the outline/annotate document, e.g. the spontaneous presentation. Thus, the contents selected for display by the presenter automatically appear in a desired location and sequence in the ongoing Power Point™ or Slide Show™ presentation. Again, the output of slide sequencer 122 is directed to computer slide projector 124 for display on video screen 126 for the live audience to observe.

Those of skill in the art will appreciate that Power Point™ applications can be controlled from another application such as the invented Instant Point™ Outliner/Annotator software 110 by use of such shareware as is described and available at www.bacuslabs.com/activexcontrol.html, www.indezine.com/products/powerpoint/ppactivex.html or www.anydraw.com/. A description of ActiveX and COM is available at www.microsoft.com/com/default.mspx and a tutorial that illustrates how to programmatically control Power Point™ from another application can be found at www.codeguru.com/cpp/com-tech/activex/tutorials/article.php/c5569/. These websites provide information that straightforwardly enables one of skill in the art to program mixer 118 and slide sequencer 122 to operate as described and illustrated herein to mix or blend content from two different sources within a Power Point™ file. Those of skill in the art will appreciate that similar tools are available for alternative presentation applications such as Slide Show™.

For example, in accordance with one embodiment of the invention, the outline/annotate portion of the lecture that is spontaneously produced by the voice recognition software is overlaid within a text box that appears on video screen 126. Such is done by following the INDEZINE tutorial "Creating Editable Text Box Objects." These editable text box objects can be 'typed' in, effectively, while a Power Point™ show is running, by the presenter simply voicing an outline or notes into microphone 106 and voice recognition software 108. Thus, the output of voice recognition software 108 becomes the text equivalent of typing and is the input to the editable text box that is rendered visible on video screen 126.

Those of skill in the art will appreciate that other overlay mechanisms for mixing or blending spoken outlines of notes and canned AV presentations are within the spirit and scope of the invention. For example, a so-called 'Times Square' display similar to close captioning of television broadcasts could be used to convey the spoken portion of the presentation on the video screen, or the outline or notes could be interspersed with the canned AV presentation instead of being collected in a text box overlay, by the simple expedient of the presenter using a cursor control device to indicate where the spoken text should appear on the video screen. Such interspersed notes could be readily distinguished from the canned presentation by being presented in different fonts or sizes or styles or colors, etc.

Those of skill in the art also will appreciate that any one or more of outline/annotate document 114, stored document 116 and annotated document 120 can be provided over the world-wide web, or Internet, 128. Thus, in accordance with one embodiment of the invention, Instant Point™ Outliner/Annotator software 110 includes a webpage mechanism 130 for providing remote access to one or more of the documents, as illustrated. This permits students or audience members who attended or failed to attend a lecture or other live presentation to gain access to the lecture or presentation in substantially the same form it might have been viewed in the live presentation. The advantage, of course, by virtue of the present invention, is that the student or audience member who accesses the document over the Internet benefits also from whatever annotations that may have been made, whether before, during or after the presentation.

Off-the-shelf voice recognition software is not perfect in the recognition of spoken words and the conversion thereof to digital text. But these programs have dramatically improved in recent time and further improvements are contemplated. They are predicted to operate so effectively soon that they will become part of all commercially available PC OSs. At that time the use of voice recognition software by individuals will reach new levels of acceptance and nearly universal use. As an individual uses a single computer equipped with voice recognition software the so-called 'smart' voice recognition software produces fewer errors with time, enabling the user to make fewer corrections in the resulting text in the output word document. Nevertheless, the output of these programs will never be perfect and will always need modification or correction.

Thus, in accordance with one embodiment of the invention, an edit feature is provided within Instant Point™ Outliner/Annotator software 110 in the form of a correction and modification or annotation edit panel 132. Instant Point™ Outliner/Annotator software 110 thus is equipped to receive inputs from PC 102 via a keyboard, touchpad and/or mouse (not shown for the sake of clarity) associated with PC 102 to correct the erroneous word or words in the final output on video screen 126. Voice-activated corrections also or instead can be entered into the Instant Point™ Outliner/Annotator software 110 via microphone 106 and voice recognition software 108. An additional use of the Instant Point™ Outliner/Annotator software annotation edit panel 132 would be to allow the presenter to change selected text characteristics, e.g. font, size, color, boldface, underscore, italics, etc.

Those of skill in the art will appreciate that panel 132 can include a hardware counterpart that is wired or wirelessly connected to PC 102 so that the presenter conveniently can operate the annotation edit functions at some distance from PC 102. Those of skill in the art will also appreciate that pushbutton switch S1 can be separately provided at the end of a cord for portability, or it may be integrated functionally into panel 132 for portable control via the former of which selective voice segments are recorded in annotate/outline document 114 as well as for portable control via the latter of the quality of the voice recognition/conversion process.

When switch S2 is set to convey outline/annotate document 114 to slide sequencer 122 (switch S2 in the 1 O'clock position shown as a dashed line in FIG. 1), the presenter can select key points during the lecture and present them in outline form before or during the lecture. Alternatively, when switch S2 is set to convey stored document 116 to slide sequencer 122 (switch S2 in the 8 O'clock position shown as a dashed line in FIG. 1), the presenter can select the canned slide sequence for presentation as the lecture was originally conceived. Alternatively, when switch S2 is set to convey annotated document 120 to slide sequencer 122 (switch S2 in the 10 O'clock position shown as a solid line in FIG. 1), the presenter can display important concepts and explanations of these key points in outline/annotate form near each key point on the video screen 126 as the presentation progresses. Thus the operational position of switch S2 can be positioned selectively by the presenter operating PC 102 to display on video screen 126 whichever is believed to be most effective in communication the point of the presentation.

Those of skill in the arc will appreciate that switch S2 represents a switching or selection function that is preferably provided as a part of software 110. Accordingly, the switch can take any suitable form, e.g. it may be a mode cantrol switch programmed into a keyboard operatively coupled with PC 102, or it may be a macro that is invoked by the presenter as a part of a pop-up or pull-down menu, or it may be a reserved key that is treated as a special function key, or it may be a cursor control key cluster, etc. Any suitable hardware, firmware or software form of switch S2 is contemplated as being within the spirit and scope of the invention.

Alternatively, but within the spirit and scope of the invention, only that which is spoken into voice recognition software 108 can be formulated into an outline/annotate document for presentation via a slide projector onto a video screen. In other words, one embodiment of the invention would require no stored document, mixer or annotated document or even switch, but instead would directly convey the output of outline/annotate document 114 produced from voice recognition software 108 through slide sequencer 122 and slide projector 124 onto video screen 126, thereby making appropriate use of voice recognition software in making a simple oral presentation that is visually interpreted on a video screen. Such a lecture could nevertheless be accessed and viewed or listened to online via Internet 128 and website interface mechanism 130, as illustrated in FIG. 1.

Preferably, however, in accordance with one embodiment of the invention, annotated document 120 is selected for display on video screen 126, thus giving the audience members the benefit not only of the presenter's original concepts but also the benefit of the audience's participation at the live presentation in a rich, real-time display of text, graphic, flash, multimedia and/or other content representing a dynamic interaction between presenter and audience.

Thus, the Instant Point™ Outliner/Annotator invention produces a "dynamic" visual aid presentation significantly improving the usefulness and operation of all current computer visual aid programs. The invention thus greatly increases the involvement of the audience in the presentation and the attentiveness of the audience. Participation by the members of the audience is maximized by placing switch S2 in the position that directs the annotated output to slide sequencer 122. Here the audience member asks a question or makes a comment for the presenter. The presenter then activates first switch S1 and repeats the question or comment for subsequent or concurrent display on video screen 126 along with the contents of original stored document 116 in the form of annotated document 120. The presenter then answers the question or clarifies the comment and optionally displays this text on the screen as well (by activating switch S2), in real-time response to the annotation function of voice recognition software 108 and mixer 118.

Such live interaction motivates the audience members to participate in the presentation or lecture, which is a universal problem in education and any verbal presentation. This is another feature of the Instant Point™ Outliner/Annotator invention that produces what will be referred to herein as a "dynamic" visual aid program. This feature of the Instant Point™ Outliner/Annotator invention further distinguishes the invention over the prior art.

Finally, outline/annotate document 114 and/or stored document 116 and/or annotated document 120 representing the alternative versions of the text and graphics displayed on the video screen 126 can be transferred to the Internet 128 for display on a class web site or to the presenter's own web page. Such is rendered possible by inclusion in Instant Point™ Outliner/Annotator software 110 of a webpage mechanism 130, as is schematically illustrated between Internet 126 and documents 114, 116, 118. This enables the class members—particularly ones with difficulty understanding the voice of the presenter due to hearing disabilities or accents—to comprehend the lecture given by the presenter. The students can review the lecture for any reason, improving their learning and retention. Also, the presenter can review the lecture and notes optionally or selectively and permanently to incorporate the questions and comments captured by the Instant Point™ Outliner/Annotator software 110 within the visual aid program for future use. This is yet another way that the Instant Point™ Outliner/Annotator invention changes the prior art from operating 'statically' to evolving in time 'dynamically'.

All of these improvements in the operation of the prior art in the field of computer visual aids will dramatically improve oral presentations. This invention will drastically improve educational, sales, and other motivational and inspirational oral presentations. The invention represents the future of visual aid use in the world today.

Figure 2:
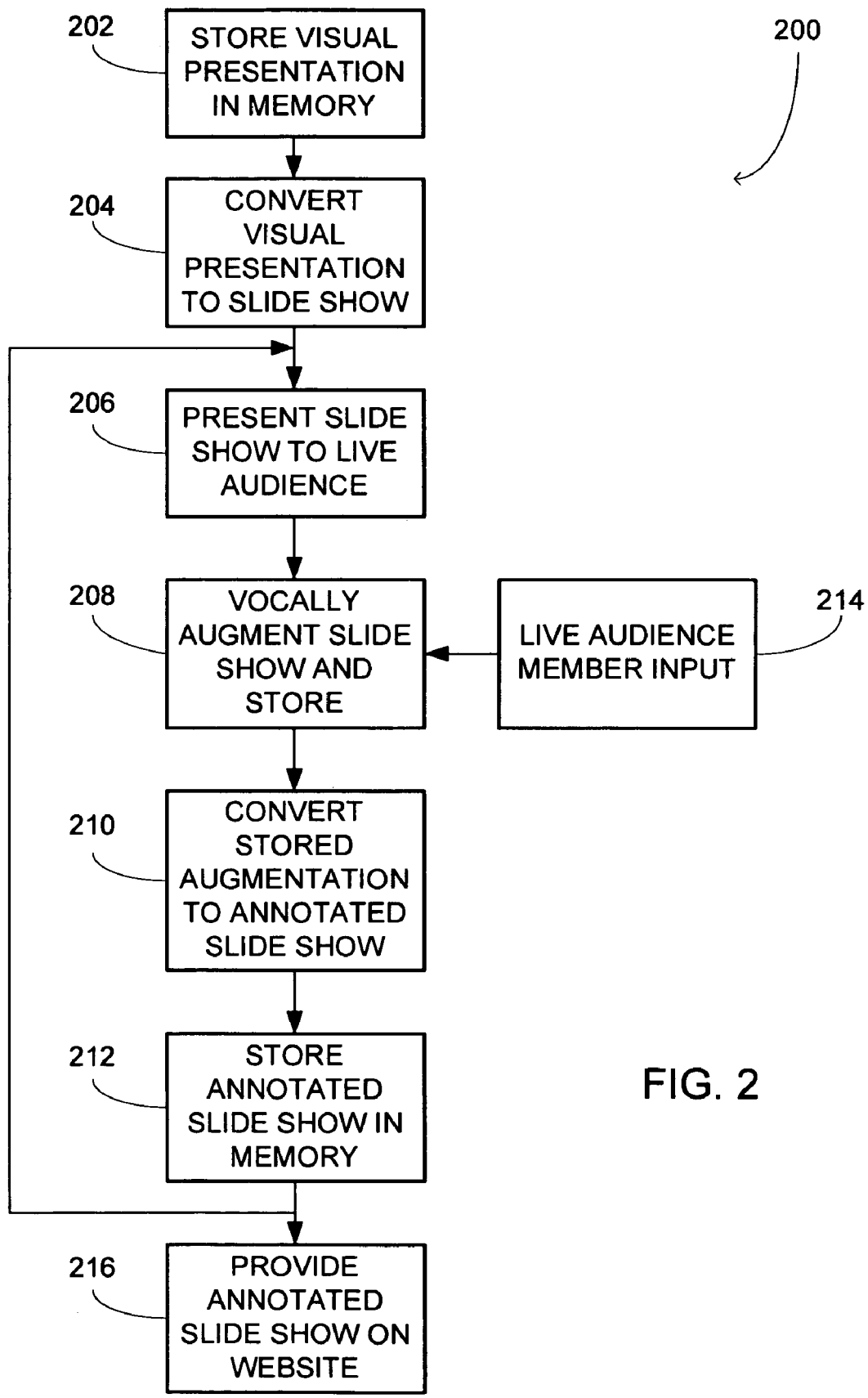
FIG. 2 is a flowchart illustrating the invented method, in accordance with one embodiment of the invention.

The method of capturing and presenting live lecture notes will be understood to include the steps indicated as blocks in the flowchart of FIG. 2.

FIG. 2 shows the steps as including a) at 202, storing a visual (or, optionally, an audiovisual (AV)) presentation in a memory; b) at 204, converting the visual presentation to a slide show; c) at 206, presenting the slide show to a live audience; d) at 208, vocally augmenting the slide show, e.g. using microphone 106 and voice recognition software 108, and storing the augmented slide show in a memory; e) at 210, converting the stored augmentation to a slide-shoe compatible visual presentation that annotates the slide show; and f) at 212, storing the annotated slide show in a memory.

Those of skill in the art will appreciate that one or more live audience members can input to the vocal augmentation step, as indicated at block 214. Such might involve engaging the live audience member in a vocal dialog, wherein a representation of the vocal dialog is stored as a vocal augmentation of the slide show in the memory. Those of skill in the art will also appreciate that blocks 206, 208, 210, 212 are repeatable, as indicated by the directed arrow in FIG. 2 representing a loop, so that, for example, a succession of slides are shown with vocal augmentation and the possibility of audience input and/or so that, for example, a succession of presentations is given to various live audiences at successive times and locations with additional vocal augmentation becoming part of each successive live presentation. Those of skill in the art will also appreciate that, as indicated at block 216, the stored, annotated slide show can be provided on a website. Finally, those of skill in the art will appreciate that access to the annotated slide show can be provided to a world-wide web audience, e.g. by use of website interface mechanism 130 and Internet 128.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

From the foregoing, those of skill in the art will appreciate that several advantages of the present invention include the following.

Illustrative of the important advantage of the Instant Point™ Outliner/Annotator invention is that it converts any of these computerized visual aid software programs into a "dynamic" and instantaneously changing utility. Through the use of this new technology, the oral presentation becomes spontaneous and evolving rather than static and boring. This dramatically improves the desired outcome of the lecture/oral presentation, in that it further increases the viewer's attention to and retention of the presentation. Also, improvements made by live-presentation annotations created by the Instant Point™ Outliner/Annotator on a visual aid frame will be stored and available for the next presentation. The computerized program projected onto the screen will improve naturally much like evolution and natural selection in biology.

It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that the method, system and apparatus of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

I claim:

1. A live-presentation utterance-capture system comprising:
   a microphone accessible to a speaker at a live presentation;
   a voice-recognition mechanism configured linguistically to interpret a vocal utterance received at the microphone from the speaker;

a database mechanism operatively coupled with the voice-recognition mechanism, the database mechanism configured to store the linguistic interpretation of the vocal utterance in a visual form;

a mixer configured to alter a visual representation of a prepared slide by including within the slide a visual representation of the vocal utterance, the mixer operating to overlay one of the visual representation of the prepared slide and the visual representation of the vocal utterance with the other;

a presentation mechanism configured to present to an audience at the live presentation the visual representation of the vocal utterance stored in the visual form;

a prepared slide storage mechanism coupled with the presentation mechanism, the storage mechanism and the presentation mechanism being collectively configured concurrently to present to the audience at the live presentation a visual representation of the prepared slide and the visual representation of the vocal utterance;

a memory configured to store one or more of plural instances of such images;

an image sequencer configured to sequentially present plural images in succession, at least one of the plural images being the output of the mixer and including the combined visual representation of the prepared slide and the visual representation of the vocal utterance;

a website interface mechanism configured to provide access to the plural images by remote users over the world-wide web; and an edit panel configured to enable corrections by the speaker of any misinterpretations made by the voice recognition mechanism and configured to enable altering at least one text characteristic selected from among spelling, grammar, font type, size, color, boldface, underscore, and italics.

2. The system of claim 1, wherein the database mechanism is operable by the speaker selectively to store the linguistic interpretation of the vocal utterance, the database mechanism including a speaker-actuated switch for selective storage of the linguistic interpretation of the vocal utterance.

3. A method of capturing and presenting live lecture notes, the method comprising:

storing a visual presentation in a memory;

converting the visual presentation to a slide show;

presenting the slide show to a live audience;

vocally augmenting the slide show using a microphone and voice recognition mechanism and storing a representation of the vocal augmentation in a memory;

converting the stored augmentation to a slide-show-compatible visual, textual form;

selectively annotating the slide show by mixing via a mixer the converted augmentation with visual content of the slide show including overlaying one of the visual presentation of a prepared slide and the slide-show-compatible textual form with the other, the selective annotation being selectable by the use of a switch;

reviewing the annotated slide show for at least one textual misinterpretation made by the voice recognition mechanism and correcting any misinterpretations with an edit panel configured to enable corrections including altering at least one text characteristic selected from among spelling, grammar, font type, size, color, boldface, underscore, and italics;

presenting to the live audience via a presentation mechanism the annotated slide show including the converted vocal augmentation in the visual, textual form, the presentation mechanism being operatively coupled with a prepared slide storage mechanism, the storage mechanism and the presentation mechanism being collectively configured concurrently to present to the audience at the live presentation a visual representation of the prepared slide and the visual, textual representation of the converted vocal augmentation, and being operatively coupled with an image sequencer configured to sequentially present plural images in succession, at least one of the plural images being the output of the mixer and including the combined visual presentation of the prepared slide and the visual, textual representation, of the converted vocal augmentation, and being further operatively coupled with a website interface mechanism configured to provide access to the plural images by remote users over the world-wide web; and storing in a memory the annotated slide show including the representation of the vocal augmentation in a memory.

4. The method of claim 3, wherein the augmenting includes engaging a member of the live audience in a vocal dialog, and wherein a representation of the vocal dialog is stored as a vocal augmentation of the slide show in the memory.

5. The method of claim 3 which further comprises:

presenting the stored annotated slide show including the representation of the vocal augmentation to a live audience, the presenting being selective, selection being achieved by the use of a switch.

6. The method of claim 3 which further comprises:

providing access to the stored annotated slide show including the representation of the vocal augmentation to a world-wide web audience.

7. Live audiovisual presentation capture/display apparatus comprising:

a computer equipped with a microphone;

a memory associated with the computer;

a first set of software instructions residing in the memory and executing in the computer, the first set of software instructions configured to recognize and store in text form an utterance received from a live speaker at the microphone;

a display mechanism configured to display to a live audience, a member of which is physically present with the live speaker, the stored text representing the utterance;

a stored document residing in the memory, the stored document representing one or more prepared images representing a visual presentation;

a mixer comprising a second set of software instructions residing in the memory and executing in the computer, the second set of software instructions configured to mix the contents of the stored text form utterance within the stored visual presentation document in real time during a live presentation to the live audience for selective concurrent display of the mixed contents by the display mechanism;

an edit panel configured to enable corrections by the speaker of any misinterpretations made by the voice recognition mechanism and configured to enable altering at least one text characteristic selected from among spelling, grammar, font type, size, color, boldface, underscore, and italics;

a prepared slide storage mechanism coupled with the display mechanism, the storage mechanism and the display mechanism being collectively configured concurrently to present to the live audience a visual presentation including the prepared images and the text form of the utterance;

a memory configured to store one or more of plural instances of such images;

an image sequencer configured to sequentially present plural images in succession, at least one of the plural images being the output of the mixer and including the combined visual presentation of the prepared images and the text form of the utterance; and a website interface mechanism configured to provide access to the plural images by remote users over the world-wide web.

8. The apparatus of claim 7, wherein the display mechanism includes a projector and a video screen.

9. The apparatus of claim 8 which further comprises:
an annotated document residing in the memory, the annotated document representing the mixed contents of the stored text form utterance and the stored visual presentation document.

10. The apparatus of claim 9, wherein the annotated document represents one or more slides at least one of which represents the mixed contents, which further comprises:
a slide sequencer configured to display the one or more slides in a defined sequential order.

11. The apparatus of claim 10 which further comprises:
a switch operable by the live speaker, the switch being configured selectively to convey one of the stored document and the annotated document to the display mechanism for the selective concurrent display thereof and for viewing by the live audience.

* * * * *